United States Patent [19]

Kondo

[11] Patent Number: 4,791,741
[45] Date of Patent: Dec. 20, 1988

[54] CARD WITH BUILT-IN RECORD/PLAYBACK CAPABILITY

[75] Inventor: Takenori Kondo, Gifu, Japan

[73] Assignee: Torio Electronics Co., Ltd., Gifu, Japan

[21] Appl. No.: 92,867

[22] Filed: Sep. 3, 1987

[30] Foreign Application Priority Data

Jan. 19, 1987 [JP] Japan .................................. 62-10685

[51] Int. Cl.⁴ .............................................. G09F 1/00
[52] U.S. Cl. ...................................... 40/124.1; 40/455; 369/64
[58] Field of Search ............... 40/455, 124.1; 446/404; 434/309, 311; 369/68, 63, 64

[56] References Cited

U.S. PATENT DOCUMENTS

| | | | | |
|---|---|---|---|---|
| 3,159,942 | 12/1964 | Fiske | .................... | 369/64 |
| 3,691,312 | 9/1972 | Peterson | ................. | 40/455 |
| 3,798,806 | 3/1974 | Sanford | .................. | 40/455 |
| 4,222,188 | 9/1980 | Tarrant et al. | ......... | 40/455 |

FOREIGN PATENT DOCUMENTS

| | | | | |
|---|---|---|---|---|
| 2155858 | 10/1985 | United Kingdom | ................. | 40/455 |
| 8102215 | 8/1981 | World Int. Prop. O. | ............ | 40/455 |

Primary Examiner—Robert Peshock
Assistant Examiner—Cary E. Stone
Attorney, Agent, or Firm—Jordan and Hamburg

[57] ABSTRACT

Card or postal media which comprises a storage member to retain audio information picked up by a microphone, a sound generating member including a speaker, a mode selection signal producing member to allow either record or playback to be selected, a controller performing record or playback according to the mode selection signal from the mode selection signal producing member; converting the audio signal from the microphone from analog to digital and storing it in the storage member when the record mode is selected; retrieving stored information from the storage member, converting it from digital to analog, and outputting the analog signal to the sound generating member when the playback mode is selected, and a card board on which the microphone, speaker, and the other members are mounted.

6 Claims, 5 Drawing Sheets

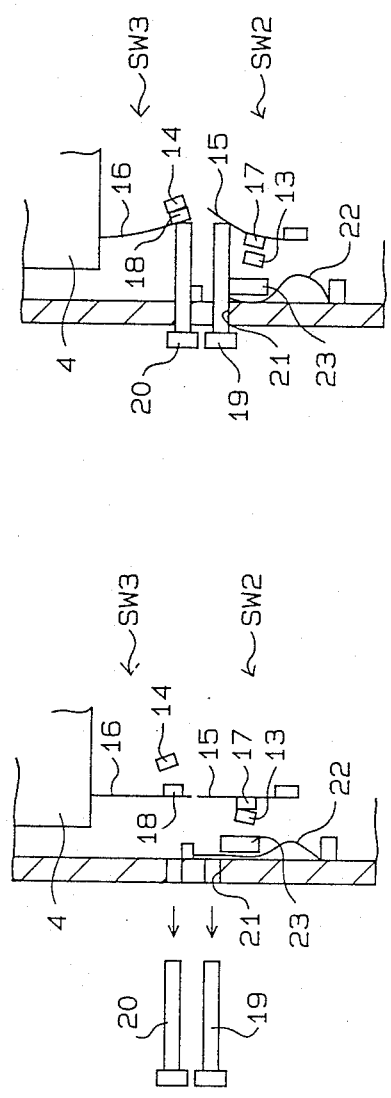

(a) Record Mode / Playback mode (b) Reset Signal (c) Start Signal (d) Stop Signal

CARD WITH BUILT-IN RECORD/PLAYBACK CAPABILITY

FIELD OF THE INVENTION

This invention is related to cards and postal media, and in particular to cards and postal media which can record and playback messages or music.

DESCRIPTION OF THE RELATED ART

An existing example of this type of card is described in a patent application laid open to public inspection under Japanese provisional publication No. 146599/86. With this type of card, the sound generation circuit is activated by opening the cover and messages and music stored beforehand are played back. Since these existing cards are of a read-only type, the user cannot record his (her) own messages or music, limiting it usefulness and convenience.

SUMMARY OF THE INVENTION

The purpose of this invention is to provide a card or postal media with which the user can record his (her) own messages or desired music, and from which the recipient can easily play back them. The card should find extensive use as a gift card, greeting card, congratulatory card, birthday card, Christmas card, etc.

The second purpose of this invention is to provide a card or postal media which is easy to carry or store.

The third purpose of this invention is to provide a card or postal media made up of a reduced number of parts which can be produced at lower cost and has improved operability.

Yet another purpose of this invention is to provide a card or postal media with a record/playback method which cannot be interrupted unintentionally.

To accomplish the above purposes, the card of this invention comprises the followings: (1) means for storing audio information picked up by a microphone; (2) means for generating sound including a speaker; (3) means for producing a mode selection signal corresponding to any one of a record mode and a playback mode; (4) control means for selectively setting any one of the record or playback modes according to the mode selection signal from the producing means, converting audio from the microphone from analog to digital and storing it in the storage means when the record mode is selected, retrieving stored information from the storage means converting it from digital to analog, and outputting the analog signal to the generating means when the playback mode is selected; and (5) a card board on which the microphone and each means are mounted.

The other purposes of this invention will become obvious by understanding the embodiments of this invention described below, and people skilled in this art can easily recognize many advantages of this invention.

BRIEF DESCRIPTION OF THE DRAWINGS

FIG. 5 (*a*) is a partially enlarged section view to show the state when the pins are attached.

FIG. 5 (*b*) is a partially enlarged section view to show the state when the pins are removed.

FIG. 6 (*b*) shows the power supply and power switch.

DETAILED DESCRIPTION OF A PREFERRED EMBODIMENT

A preferred embodiment of this invention is described below in detail using drawings.

Figure 1:
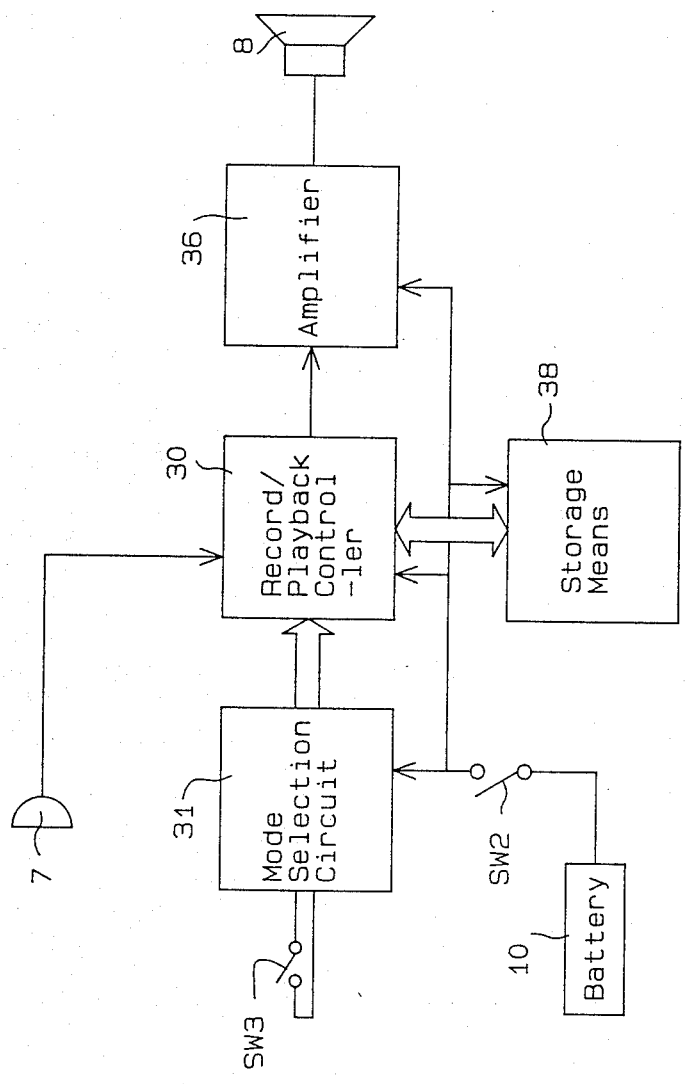
FIG. 1 is a simple block diagram which illustrates the construction of the card of this invention.
Figure 2:
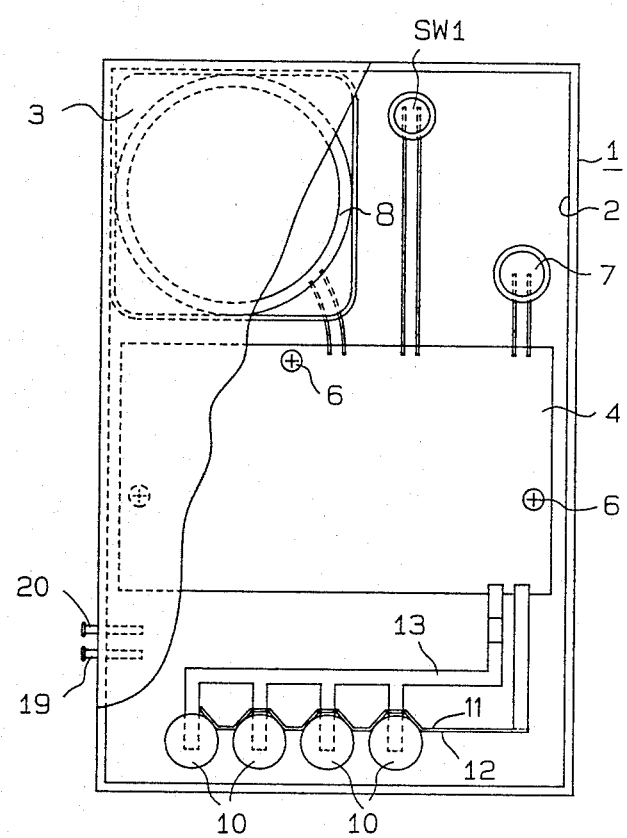
FIG. 2 is a partially broken front view of the card as a preferred embodiment of this invention.
Figure 3:
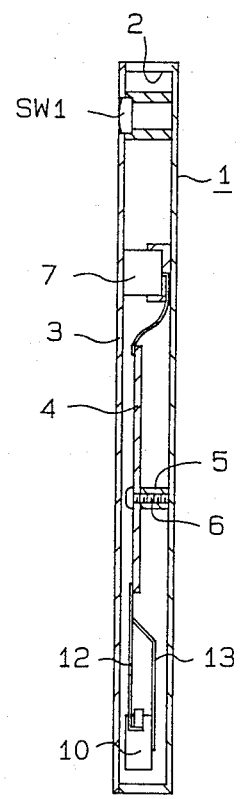
FIG. 3 is the side section view of the card.
Figure 4:
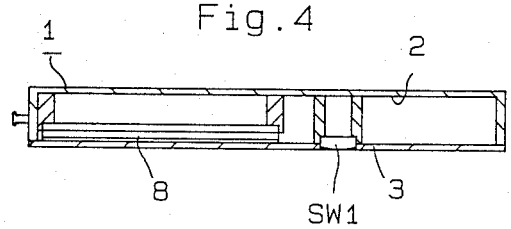
FIG. 4 is the top section view of the card.

The card board 1 is made of a synthetic resin and is formed into the shape of a thin box with an opening at one side as shown in FIGS. 2 to 4. The opening 2 is covered by a cover 3. The card board 1 and cover 3 make up a thin plate with a cavity. A circuit board 4 is mounted on bosses 5 with screws 6 near the center of the card board 1. A microphone 7, a start switch SW1, and a speaker 8 are mounted on the card board 1 in the space to one side of the circuit board 4. Four lithium batteries 10 are held in the space to the opposite side of the circuit board 4 and connect to the circuit board 4 with the two wires 11 and 12.

A power switch SW 2 and a record/playback switch SW 3 are located to the same side of the circuit board 4 in the card board 1. The switches SW 2 and SW 3 consist of fixed contacts 13 and 14 standing at the bottom of the card board 1 and pieces 15 and 16, preferably springs, having their ends attached swingably to the bottom of the card board 1. Moving contacts 17 and 18 are mounted on the springs 15 and 16, respectively.

A pair of control pins 19 and 20, in correspondance with the switches SW 2 and SW 3, are inserted detachably into the card board 1 through the holes on one side. The pin 20 is used for selecting the record or playback mode. When the record/playback selection pin 20 is inserted, it pushes against the spring 16 and causes the moving contact 18 to come into contact with the fixed contact 14, as shown in FIG. 5 (*a*), thus closing the record/playback selection switch SW 3. when the record/playback selection pin 20 is removed, the moving contact 18 is separated from the fixed contact 14 by the return force of the spring 16 and the record/playback selection switch SW 3 opens.

The pin 19 is used for turning on and off the power supply to the circuits. When the power on/off pin 19 is inserted through the hole 21, it pushes the spring 15 and causes the moving contact 17 to separate from the fixed contact 13, as shown in FIG. 5 (*a*), thus keeping the power switch SW 2 open. When the pin 19 is removed, the spring 15 returns back toward the fixed contact 13 by spring tension and causes the moving contact 17 to come into contact with the fixed contact 13; by which the power switch SW 2 is closed.

A stopper 22, which closes the hole 21 after the power on/off pin 19 is removed, is made of a flat spring and held along the side of the card board 1, with one end bent to store return force. When the pin 19 is removed, the entire stopper 22 stretches guided by the guide 23, and its sliding end closes the hole 21.

Figure 6A:
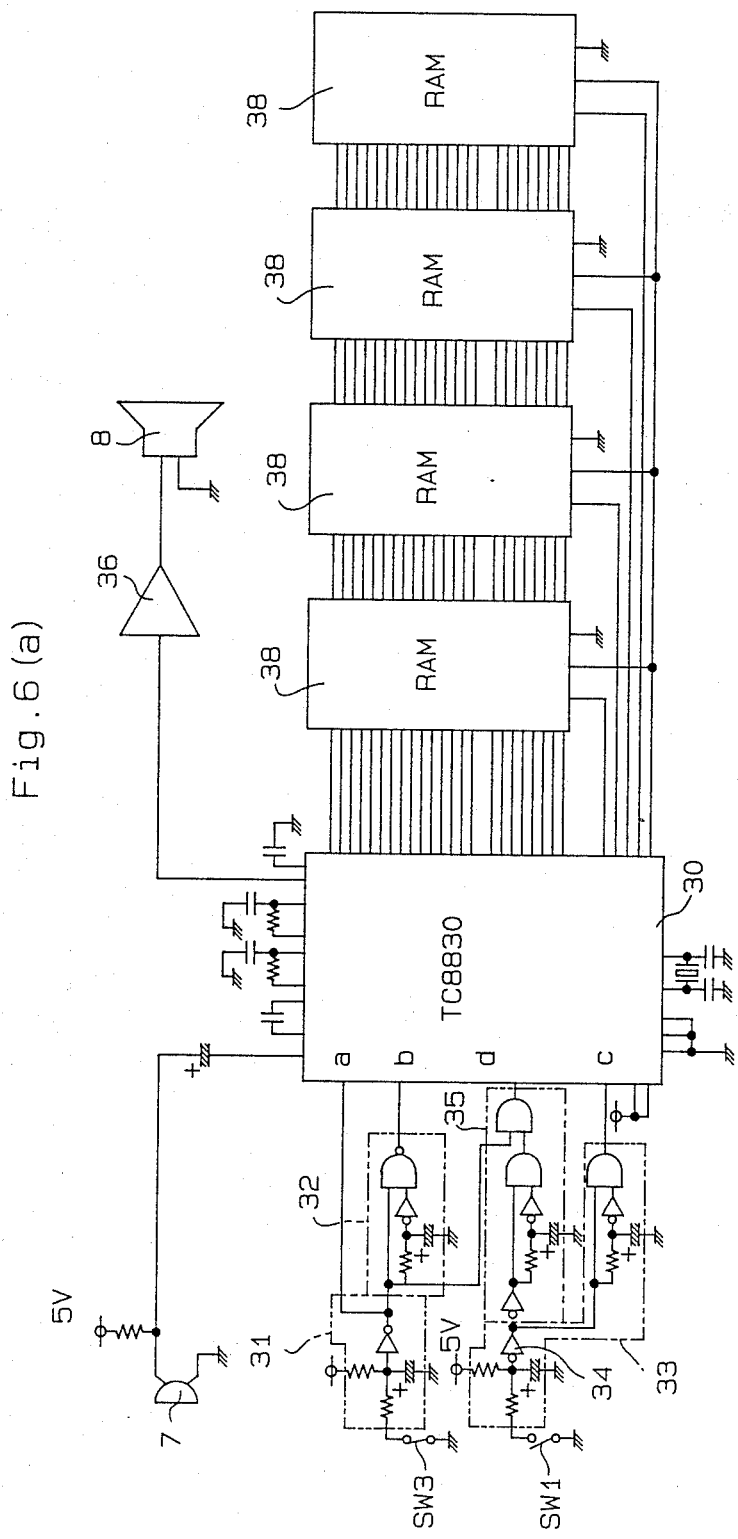
FIG. 6 (*a*) is the block diagram of the record/playback devices.
Figure 6B:
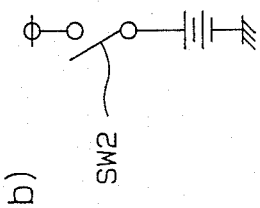
Figure 7:
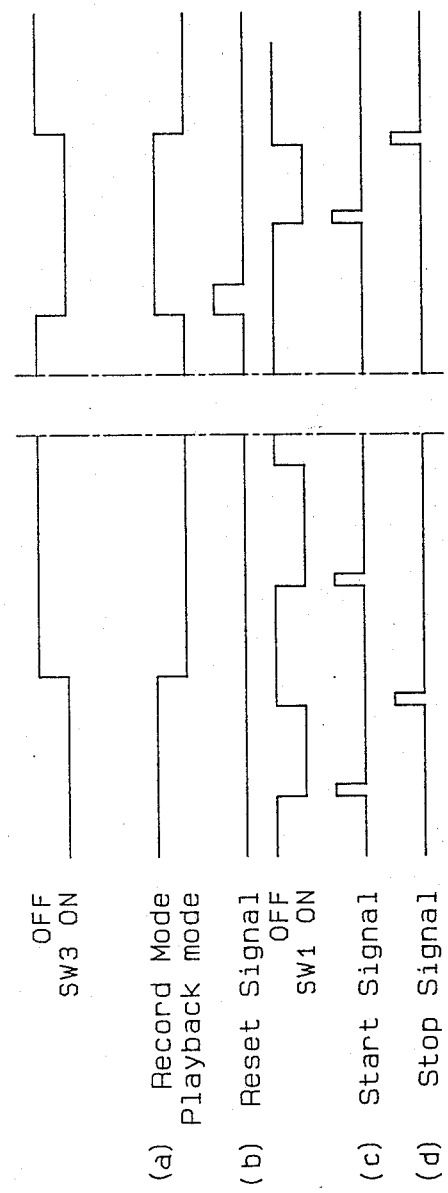
FIG. 7 is the timing diagram which shows the operation of this card.

IC 30 (Tohsiba TC8830) mounted on the circuit board 4 is the record/playback controller, and a mode selection circuit 31 is located between an input pin a of IC 30 and the power switch SW 3, as shown in FIG. 6 (*a*). The mode selection circuit 31, together with the switch SW 3, constitutes a signal producing means and outputs a mode selection signal according to the status of the record/playback selection switch SW 3, as shown in FIG. 7. IC 30 sets the selected mode in response to the mode selection signal.

A reset signal generation circuit 32 is connected between the mode selection circuit 31 and an input pin b of IC 30; this circuit 32 outputs a reset signal whenever the power switch SW 2 is closed after the playback mode has been set, as shown in FIG. 7. A start signal generation circuit 33, connected between the start switch SW 1 and an input pin c of IC 30, outputs a start signal which starts record or playback when the start switch SW 1 is closed. A stop signal generation circuit 35 is connected between an inverter 34 in the start signal generation circuit 33 and an input pin d of IC 30. The stop signal generation circuit 35 also receives the mode selection signal from the mode selection circuit 31 and outputs a stop signal when the start switch SW 1 is opened while the mode selection signal is high (record mode). No stop signal is output while the mode selection signal is low (playback mode).

An audio signal input pin of IC 30 is connected to the microphone 7 and a playback signal output pin to the speaker 8 via an amplifier 36. the amplifier 36 and the speaker 8 constitute a sound generating means.

During the record mode, the microphone 7 picks up the audio information such as voice and music and inputs it to IC 30; IC 30 converts the audio from analog to digital and stores the digital signal in the four RAM (Random Access Memory) chips 38. The RAM 38 constitues a storage means and can store up to 32 seconds of information. During the playback mode, IC 30 retrieves the audio information from the RAM 38, converts if from digital to analog, and outputs the analog signal to the amplifier 36.

All the circuits described above are supplied with +5V DC from the lithium batteries 10.

Next, the operation of the card described above is explained, using the timing diagram in FIG. 7.

If the power on/off pin 19 of the two pins inserted as shown in FIG. 5 (a) is removed from the card board 1, the moving contact 17 comes into contact with the fixed contact 13 to close power switch SW 2 as shown in FIG. 5 (b) and power is supplied to each circuit as shown in FIGS. 6 (a) and (b). After the controll pin 19 is removed, the stopper 22 closes the hole 21 to prevent the control pin 19 from being inserted again. At this time, the moving contact 18 is in contact with the fixed contact 14 pressed by the pin 20 and the record/playback selection switch SW 3 is closed. The mode selection circuit 31 then outputs the record mode selection signal and IC 30 sets the record mode accordingly.

If a message or a music is picked up the microphone 7 while the start switch SW 1 is pressed and held closed in the record mode, the start signal generation circuit 33 outputs the start signal in response to the falling edge of the ON signal from the start switch SW 1. IC 30 then starts recording operation; converting audio picked up by the microphone 7 from analog to digital and storing it in the RAM 38.

If the start switch SW 1 is released, the stop signal generation circuit 35 outputs the stop signal. In response to the stop signal, IC 30 stops recording.

The audio information stored in the RAM 38 is played back by removing the record/playback selection pin 20. If the pin 20 is pulled out, the moving contact 18 separates from the fixed contact 14 and opens the record/playback selection switch SW 3. The mode selection circuit 31 then outputs the playback mode selection signal. In response to this signal, IC 30 sets the playback mode. If the start switch SW 1 is pressed and closed while the playback mode is active, IC 30 retrieves the previously stored audio information from the RAM 38, converts it from digital to analog, and outputs the analog signal to the amplifier 36. The signal thus amplified is transformed into sound by the speaker 8. IC 30 automatically stops the playback operation regardless of the status of the start switch SW 1 when all the information is read out.

The information stored in the RAM 38 can be cleared and replaced with new information reinserting the record/playback selection pin 20. If the pin 20 is inserted, the record/playback selection switch SW 3 is closed and the mode selection circuit 31 outputs the record mode selection signal to IC 30. IC 30 then sets the record mode. At the same time, the reset signal generation circuits 32 outputs the reset signal in response to the falling edge of the ON signal from the switch SW 3. In response to this reset signal, IC 30 clears the audio information in the RAM 38. Thus, new audio information can be stored and played back using the same procedure as described above.

Since this card contains both record and playback devices in the card board, the user can easily record and playback voices or music. For this reason, this card can be widely used as a congratulatory message card or greeting card for marriages, birthdays, Christmas, and so on. In addition, this card is very easy to carry and store due to it's extremely slim profile.

Since this embodiment requires no dedicated stop switch to stop record and playback operations, the number of parts is decreased, thus allowing manufacturing and assembly cost reduction and improved operability.

Further, every circuit in this embodiment is supplied with the power by pulling out the power on/off pin 19, which prevents recording from being interrupted unintentionally.

This invention is not limited to the above embodiment and can be implemented by the following various physical configurations.

(a) Make the entire card much thinner using a flat microphone and integrated circuits together with paper-thin batteries, speaker, and switches.

(b) Use a toggle switch for the power switch SW 2 to make it possible to turn on and off the power supply as necessary.

(c) Print various messages on the faces of the card board 1 or cover 3, or design the card as a post card.

Since it is obvious that this invention can be implemented in a wide variety of embodiments within the scope of this invention, this invention is not limited by any particular embodiments except for the claims.

What is claimed is

1. Card comprising;
   (a) means for storing audio information picked up by a microphone,
   (b) means for generating sound including a speaker,
   (c) means for producing a mode selection signal corresponding to any one of a record mode and a playback mode,
   (d) control means for selectively setting any one of the record and playback modes according to the mode selection signal from the producing means; converting the audio signal from the microphone from analog to digital and storing it in the storage means when the record mode is selected; retrieving stored information from the storage means, converting it from digital to analog, and outputting the analog signal to the generating means when the playback mode is selected, and (e) a card board on which the microphone, speaker, and each means are mounted.

2. Card as claimed in claim 1, wherein the mode selection signal producing means includes a record/playback selection switch and outputs any one of the record and playback selection signals according to the ON/OFF operation of the record/playback selection switch.

3. Card as claimed in claim 2, further comprising a control pin attached to the card board and being able to engage with and separate from the record/playback selection switch, the record/playback selection switch being turned on and off by attaching or removing the pin.

4. Card as claimed in claim 1, wherein the card board is formed into the shape of a thin plate with a cavity and the microphone, speaker, and each means are mounted in the card board.

5. Card as claimed in claim 1, further including a power switch and a control pin attached removably to the card board and being able to engage with and separate from the record/playback selection switch, the pin engaging with the power switch to keep the same open when attached to the card board, the pin separating from the power switch to keep the same close when removed from the card board.

6. Postal media comprising;

(a) means for storing audio information picked up by a microphone, (b) means for generating sound including a speaker, (c) means for producing a mode selection signal corresponding to any one of a record mode and a playback mode, (d) control means for selectively setting any one of the record and playback modes according to the mode selection signal from the producing means; converting the audio signal from the microphone from analog to digital and storing it in the storage means when the record mode is selected; retrieving stored information from the storage means, converting it from digital to analog, and outputting the analog signal to the generating means when the playback mode is selected, (e) a card board on which the microphone, speaker, and each means are mounted.

* * * * *